United States Patent Office.

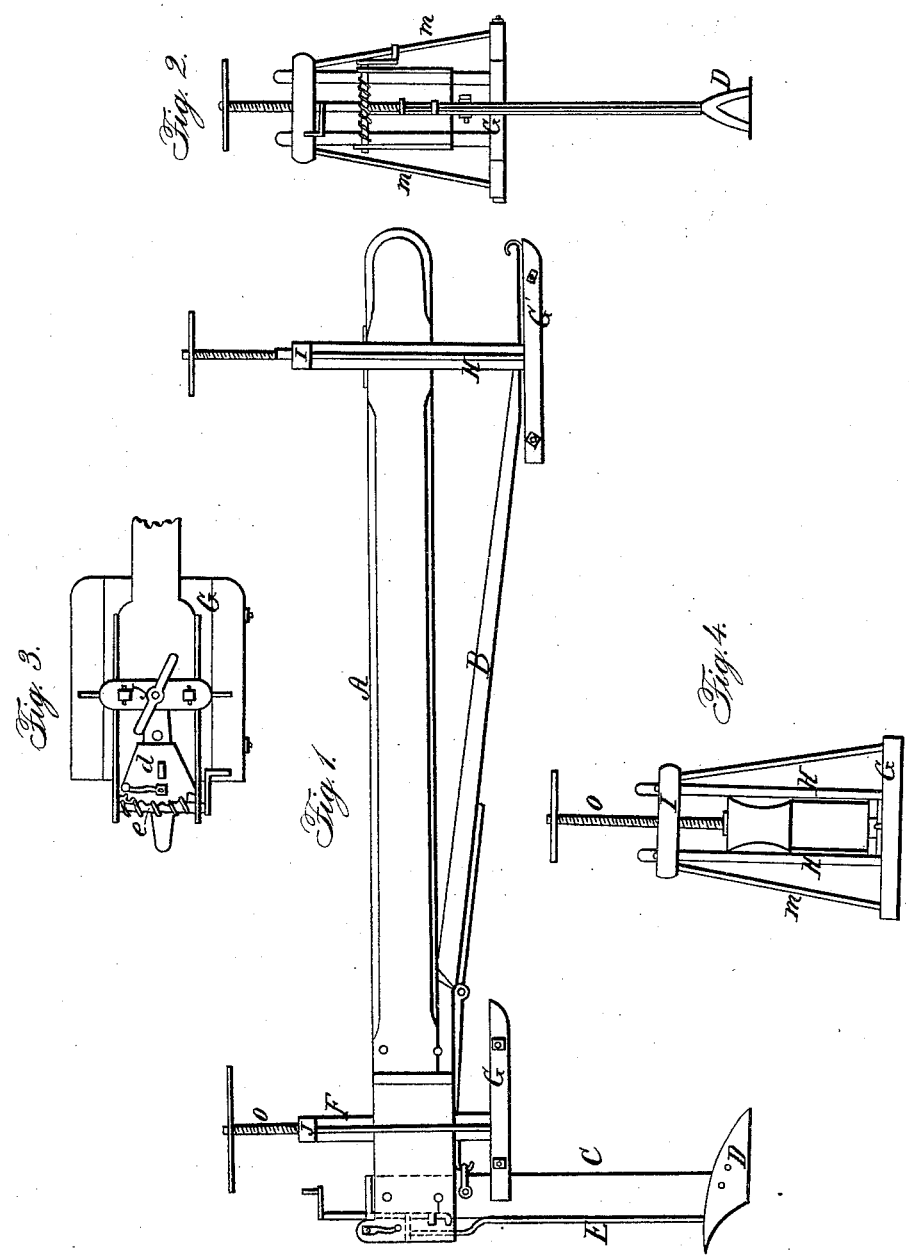

JESSE HANON, JR., OF TAYLORVILLE, ILLINOIS.

IMPROVEMENT IN DRAIN-PLOWS.

Specification forming part of Letters Patent No. 27,630, dated March 27, 1860.

*To all whom it may concern:*

Be it known that I, JESSE HANON, Jr., of Taylorville, in the county of Christian and State of Illinois, have invented certain new and useful Improvements in Drain-Plows; and I do hereby declare that the following is a full, clear, and exact description of the same, reference being had to the accompanying drawings, and to the letters of reference marked thereon.

The nature of my invention consists in constructing and arranging the several portions of this plow substantially in the manner hereinafter set forth.

In the annexed drawings, Figure 1 represents a side elevation. Fig. 2 represents a back view. Fig. 3 represents a plan view of the rear of the plow. Fig. 4 is a front view.

In the figures, A represents the beam of the plow, which is adjustable, as will be described hereinafter. Near the rear of this beam a cutter or colter, C, is secured to it, which extends downward, and is provided at its lower end with a mole, D. The mole D is pivoted to the lower end of bar C in such a manner as to be adjustable, the point being allowed a vertical play.

E represents a rod, which passes down at the rear of the cutter C and connects with the rear of the mole D. The upper end of this rod is operated by means of a screw and crank, for the purpose of changing the position of the point of the mole, when necessary. The cutter C is placed in an opening in the rear of the beam, which is large enough to allow said cutter to turn like a rudder, to guide the mole in the ground. To the top of the cutter is secured the section of a cog-wheel, d.

e represents a screw, which is secured to the rear of the beam at the back of section d, in such proximity to it that the threads of the screw will work between the cogs on said section and cause the edge of the cutter to turn to one side or the other, and thus guide the mole. The screw e lies across the beam, and is provided with a crank, by means of which it is turned.

B represents a draft-rod, which is placed under the beam, and is hinged to said beam a little in front of the colter or cutter C. To the forward end of the draft-rod B a slide, G', is attached. This slide is composed of sections of flat boards, and the several sections are secured together in such a manner that one or more of them may be removed, when necessary. In this case I secure them together by means of screw-bolts which pass through them. I may, however, employ a center board, and secure wings to each side of it by means of hinges, and said wings may be raised or lowered by means of the rods $m\ m$, which may be provided with screws and nuts upon their upper ends. Two uprights, H H, are erected upon the slide G', said uprights being connected together at their tops by means of a cross-bar, I. The rod B is secured between the uprights by means of a pin or bolt, which passes through them near their bottom, and then through the rod. The forward end of the beam plays up and down between the uprights above the rod B, and is raised and lowered by means of a screw which passes through the cross-piece I, one end being secured to the top of the beam.

F F represent uprights which pass through beam near its rear. These uprights are secured firmly to a slide, G, at their lower ends, and are connected together at their upper ends by means of a cross-piece, J. A screw, o, passes through the cross-piece J and into the beam, its lower end being secured in said beam, so that it will be allowed to turn freely. By turning the screw o the slide G will be raised or lowered, the uprights F being allowed to play through the beam. The slide G is made in sections also, and may be constructed as before described. The two slides at the front and rear of the machine are made broad when ditching on level ground or smooth ground; but it sometimes occurs that it will be necessary to run a drain on uneven ground and by the side of a hill or ditch, and when this is the case one or two of the sections should be removed or raised out of the way of the contiguous earth or ground, so that the mole may be run at the proper depth.

The object of making the cutter adjustable, so that it will turn upon a center, like a rudder, is to guide the mole in any direction the operator may desire without the expense and trouble of changing the position of the capstan which is used in drawing the plow.

It is sometimes necessary to make a drain under an open ditch already made. In this case the sections or wings on the slides are removed, so that the center portion of the slide will run in the bottom of the ditch.

Having thus fully described my invention, what I claim as new, and desire to secure by Letters Patent, is—

The combination and arrangement of the rod E, colter C, and slides G G', with the beam A and rod B, substantially as and for the purpose specified.

JESSE HANON, JR.

Witnesses:
C. M. ALEXANDER,
T. H. ALEXANDER.